US012139065B2

United States Patent
Zeuner et al.

(10) Patent No.: US 12,139,065 B2
(45) Date of Patent: Nov. 12, 2024

(54) MOTOR VEHICLE LIGHTING SYSTEM FOR EMITTING POSITION-LIMITED GROUND PROJECTIONS

(71) Applicant: ZKW Group GmbH, Wieselburg (AT)

(72) Inventors: Markus Zeuner, Mank (AT); Christian Urban, Feuersbrunn (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/225,817

(22) Filed: Jul. 25, 2023

(65) Prior Publication Data

US 2024/0034223 A1    Feb. 1, 2024

(30) Foreign Application Priority Data

Aug. 1, 2022  (EP) .................................... 22188112

(51) Int. Cl.
*B60Q 1/24*  (2006.01)
*B60Q 1/26*  (2006.01)

(52) U.S. Cl.
CPC .......... *B60Q 1/247* (2022.05); *B60Q 1/2615* (2013.01); *B60Q 2400/40* (2013.01)

(58) Field of Classification Search
CPC ... B60Q 1/247; B60Q 1/2615; B60Q 2400/40
USPC ...................................... 362/520, 545, 501
See application file for complete search history.

(56) References Cited

U.S. PATENT DOCUMENTS

| | | | |
|---|---|---|---|
| 11,703,202 B2* | 7/2023 | Bushre | F21S 43/26 |
| | | | 362/520 |
| 2016/0207443 A1 | 7/2016 | Widdowson et al. | |
| 2016/0265733 A1 | 9/2016 | Bauer et al. | |
| 2017/0050558 A1 | 2/2017 | Salter et al. | |
| 2019/0016254 A1* | 1/2019 | Salter | F21V 7/06 |
| 2019/0322209 A1 | 10/2019 | Sugiyama et al. | |
| 2020/0300435 A1 | 9/2020 | Mandl et al. | |
| 2021/0325016 A1 | 10/2021 | Moser et al. | |

FOREIGN PATENT DOCUMENTS

| | | |
|---|---|---|
| DE | 102014210500 A1 | 12/2015 |
| DE | 102018203875 A1 | 9/2019 |
| EP | 1203695 A2 | 5/2002 |
| EP | 1916154 A1 | 4/2008 |

OTHER PUBLICATIONS

Extended European Search Report Issued in EP Patent Application No. 22188112.1, dated Dec. 16, 2022 (13 Pages).

* cited by examiner

*Primary Examiner* — Laura K Tso
(74) *Attorney, Agent, or Firm* — Eversheds Sutherland (US) LLP

(57) ABSTRACT

A motor vehicle lighting system (2) for emitting position-limited ground projections (B4*a*, B4*c*) for a motor vehicle (1) with a stepped height-adjustable chassis (3), wherein at least two pre-defined chassis height levels (S0, S1) are provided, namely a zero level (S0) and at least one higher operating level (S1), wherein the motor vehicle lighting system (2) includes at least two projection devices (4*a*, 4*b*, 4*c*, 4*d*), and a control unit (5) connected to each projection device (4*a*, 4*b*, 4*c*, 4*d*) for individually controlling each projection device (4*a*, 4*b*, 4*c*, 4*d*).

17 Claims, 4 Drawing Sheets

MOTOR VEHICLE LIGHTING SYSTEM FOR EMITTING POSITION-LIMITED GROUND PROJECTIONS

CROSS-REFERENCE TO RELATED APPLICATIONS

This application claims priority to European Patent Application No. 22188112.1, filed Aug. 1, 2022, which is incorporated herein by reference.

FIELD OF THE INVENTION AND DESCRIPTION OF PRIOR ART

The invention relates to a motor vehicle lighting system for emitting position-limited ground projections for a motor vehicle with a stepped height-adjustable chassis, wherein at least two pre-defined chassis height levels are provided, namely a zero level and at least one higher operating level, wherein the motor vehicle lighting system comprises the following: at least two projection devices, a control unit connected to each projection device for individually controlling each projection device, wherein each projection device is designed for assembly in or on a motor vehicle, in particular in or on a door sill of the motor vehicle, wherein each projection device is further designed to emit exactly one ground projection in an activated state assembled on the motor vehicle starting from an immediate vicinity of the motor vehicle onto a laterally surrounding ground up to a maximum flat limit angle, wherein all projection devices are attached to a common support and are arranged within a common plane and respectively have an optical axis, wherein the optical axes of the projection devices are oriented parallel to one another, wherein each projection device is a microlens projection module, wherein each microlens projection module has a light source, an entrance optic, which has a total number of micro entrance optics, which are arranged in an array, wherein the entrance optic is designed to receive light emitted by the light source, and an exit optic, which has a total number of micro exit optics, which are arranged in an array, wherein each micro entrance optic is associated with exactly one micro exit optic, wherein the micro entrance optics are designed in such a way and/or the micro entrance optics and the micro exit optics are arranged relative to each other in such a way that substantially all the light emanating from a micro entrance optic only enters the associated micro exit optic, and wherein the light preformed by the micro entrance optics can be projected by the micro exit optics in the assembled state of the motor vehicle lighting system into an area next to the motor vehicle as said ground projection, wherein at least one screen device is arranged between the micro entrance optic and the micro exit optic, wherein the beam angle of each projection device is limited towards a horizontal plane in the assembled state such that the beam is inclined downwards in relation to the horizontal plane.

Systems for emitting ground projections have become known from the prior art. The use of micro projection lens modules is also known, for example from WO 2015/058227 A1 or WO 2019110374 A1, which respectively show the structure of micro projection lens modules, which is also suitable in principle for use in the present invention. Somewhat differently from these modules, which e.g. produce a dipped beam distribution where the screen edge is very strongly illuminated and therefore the micro entry optic is focussed on it, the present invention, however, makes it possible that there is no focus on the edges of the aperture, but rather a uniform illumination of the opening is achieved in order to ideally achieve uniform illumination. This can therefore be so-called Köhler illumination, wherein, as said, the focal point of the micro entry optic is not necessarily on the screen plane, but rather is offset relative thereto (forwards or backwards as seen in the light emission direction) in order to achieve homogeneous illumination over the entire area of the aperture.

One problem of ground projection modules according to the prior art is that when used in conjunction with vehicles that have a height-adjustable chassis, distortions in the emitted ground projection can occur depending on the setting of the chassis height.

SUMMARY OF THE INVENTION

One object of the invention is to remedy this disadvantage of the prior art. This object is achieved with a motor vehicle lighting system of the type mentioned in the introduction, where, according to the invention, the control unit has a communication interface for receiving and evaluating a chassis signal, wherein the chassis signal contains information on the actual state of the chassis height level, wherein for each chassis height level, the operation of at least one projection device optimized for this purpose is provided, wherein a range limit of the ground projection results for each projection device optimized for a chassis height level on the basis of the height present in the respective chassis height level as well as the flat limit angle associated with the respective projection device, wherein the optimization of the projection devices is implemented in such a way that the projection devices optimized for the respective chassis height levels have different flat limit angles such that the flat limit angles of the projection devices, starting from that projection device that is optimized for the zero level, increase with increasing height of the chassis height levels associated with the projection devices according to the height difference from the zero level such that at least one projection device is provided for each chassis height level, the range limit of which projection device during operation of the chassis height level for which the respective projection device is optimized matches the range limit of the projection device for the zero level.

In particular, it can be provided that the control of the projection devices by the control unit is designed in such a way that the operation of those projection devices that are optimized for a lower chassis height level than the present chassis height level determined on the basis of the chassis signal is deactivated.

The invention makes it possible for the range limit to not be exceeded despite the relative height of the projection devices increasing. An optical axis of a projection device is understood as the axis along which the light is emitted from the entrance optics to the exit optics. The emission itself is then cut by the screens and thus influenced in its spatial alignment.

It can further be provided that the control of the projection devices by the control unit is designed in such a way that those projection devices that are optimized for operation with a higher chassis height level than the determined present chassis height level can still be activated. This allows overlapping of the ground projections without the range limit being exceeded.

In particular, it can be provided that the control of the projection devices by the control unit is designed in such a way that an animation can be projected as a result of a temporal sequence of activation of projection devices, wherein the temporal sequence of activation also includes those projection devices that are optimized for operation with a higher chassis height level than the determined present chassis height level.

Furthermore, it can be provided that the control of the projection devices by the control unit is designed in such a way that the operation of all projection devices that are not optimized for the determined present chassis height level is deactivated. The technical solution is characterized by a particularly high degree of robustness.

In particular, it can be provided that the projection devices optimized for different chassis height levels differ by the intended spatial positioning on the motor vehicle such that with optimization for decreasing height of the chassis height levels, the height of the assembly position of the respective projection device increases. In particular, it can be provided that the lowest projection device has the steepest angle $\alpha_{max}$ such that as the height level increases, the projection device is switched off away from the top and thus a maximum steep projection angle is always guaranteed with which distortions can be minimized.

It can further be provided that the entrance optics and the exit optics of all projection devices are identical in design, wherein the projection devices optimized for the respective chassis height levels differ from one another in the design of the screen devices.

In particular, it can be provided that the projection devices optimized for different chassis height levels differ from one another by the design of apertures such that with optimization for increasing height of the chassis height levels, the size of the respective aperture decreases. The aperture is preferably reduced in such a way that the maximum illumination range is not exceeded. A smaller size is understood as meaning that the area of the aperture is smaller.

It can further be provided that the control unit is designed to regulate the intensity of the emission of at least those light sources that are associated with the projection devices except for the projection device of the zero level.

In particular, it can be provided that as the size of the aperture decreases, the nominal power of the light sources of the corresponding projection devices is increased such that the light intensity of the light distributions emitted by different projection devices is the same. This means that the lower light transmission caused by the smaller aperture can be compensated for such that a uniformly bright lighting effect is achieved on the projection surface with different optimized projection devices at the respective chassis height level.

It can further be provided that three or more chassis height levels are provided.

In particular, it can be provided that the difference between the height of the zero level and the height of the highest chassis height level is between 1 cm and 20 cm and the chassis height levels are preferably evenly spaced apart. For example, the range can be 13 cm and extend over 3 levels, wherein starting from a middle level, a displacement of 55 mm downwards and 75 mm upwards may be possible.

Furthermore, it can be provided that the range limit of the ground projection in the assembled state of the motor vehicle lighting system is between 0.5 m and 3 m, in particular between 1 m and 2 m, wherein the range limit is measured along a flat ground at a normal distance from the longitudinal axis of the vehicle starting from a normal projection of the sill of the motor vehicle to the end of the ground projection.

In particular, it can be provided that the projection devices are arranged like a matrix on the common support and an opaque insulating layer is arranged between adjacent projection devices.

Furthermore, it can be provided that the motor vehicle, comprising at least two motor vehicle lighting systems according to one of the preceding claims, wherein the motor vehicle has a left and a right vehicle side, and each vehicle side has at least one door with a sill associated with the door, wherein the projection devices are respectively arranged in the sills.

BRIEF DESCRIPTION OF THE DRAWINGS

The invention is outlined in more detail below based on an exemplary and non-limiting embodiment, which is illustrated in the figures. In the figures

DETAILED DESCRIPTION OF EMBODIMENTS OF THE INVENTION

In the following figures, unless otherwise stated, the same reference numbers denote the same features.

Figure 1:
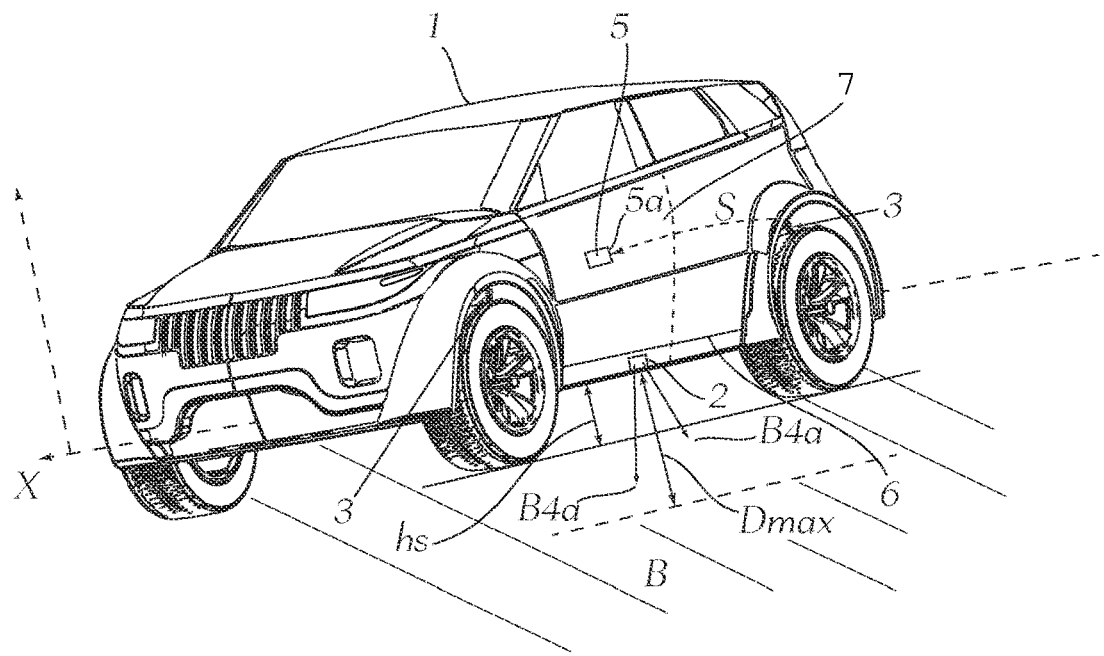
FIG. 1 shows a schematic illustration of a vehicle comprising two motor vehicle lighting systems according to the invention.

FIG. 1 shows a schematic illustration of a vehicle 1 comprising two motor vehicle lighting systems 2 according to the invention. The motor vehicle 1 comprises at least two motor vehicle lighting systems 2, wherein the motor vehicle 1 has a left and a right vehicle side, and each vehicle side has at least one door 7 with a sill 6 associated with the door 7, wherein the projection devices 4a, 4b, 4c, 4d are respectively arranged in the sills.

Figure 2:
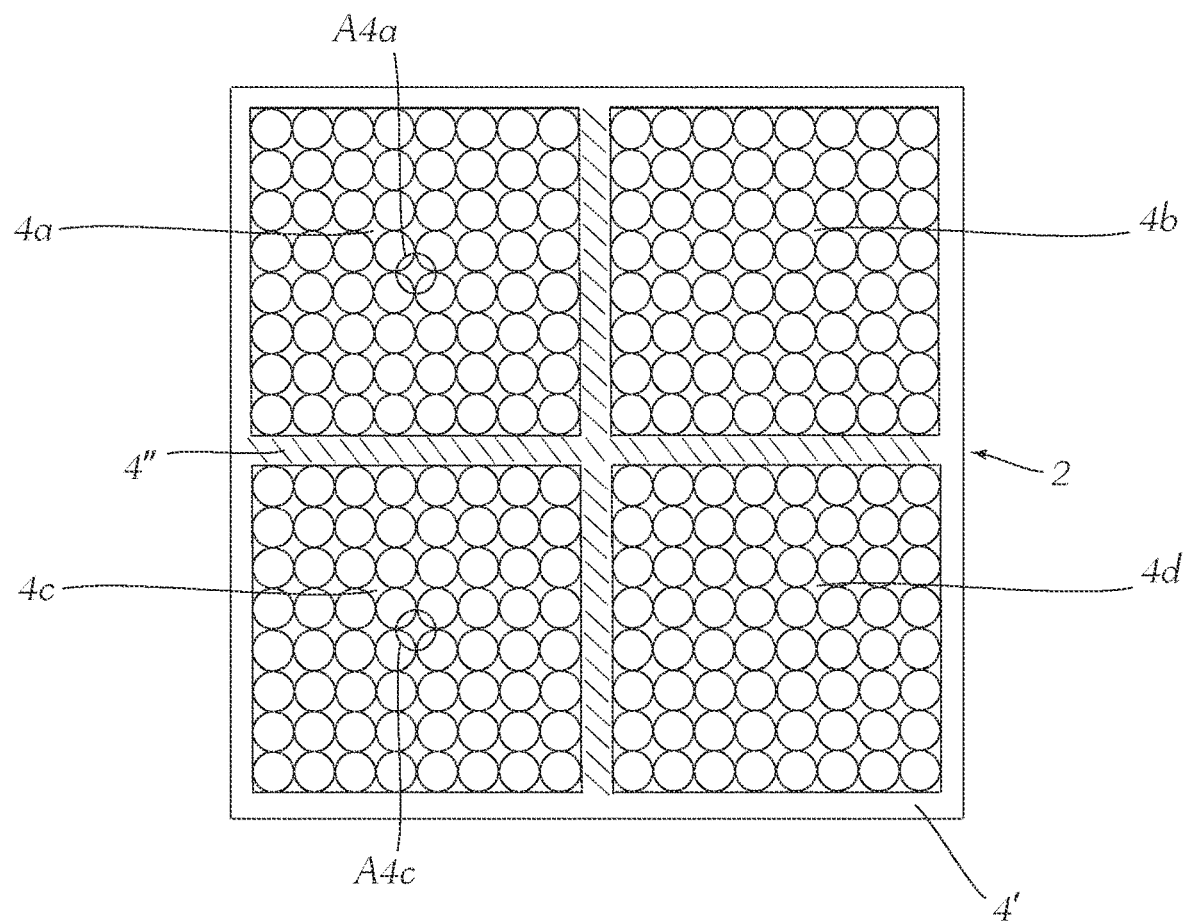
FIG. 2 shows a schematic illustration of components of a motor vehicle lighting system.
Figure 3:
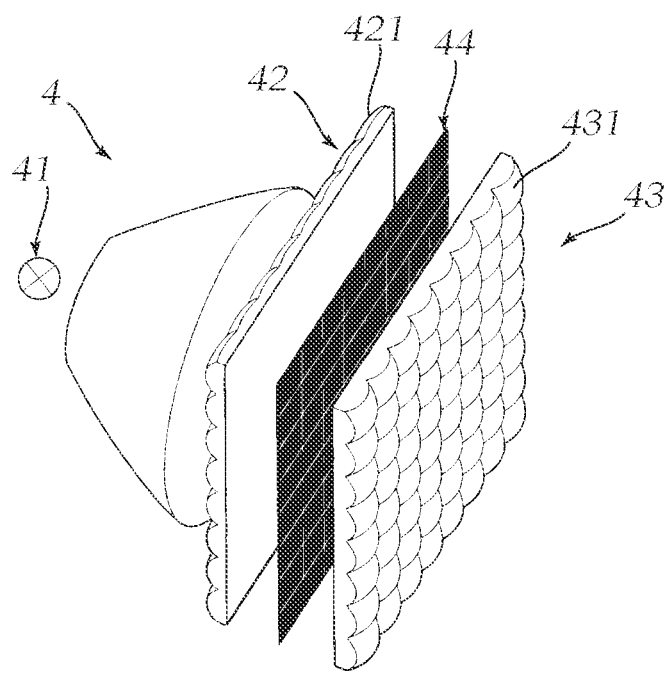
FIG. 3 shows an exemplary illustration of a micro lens projection module.
Figure 6A:
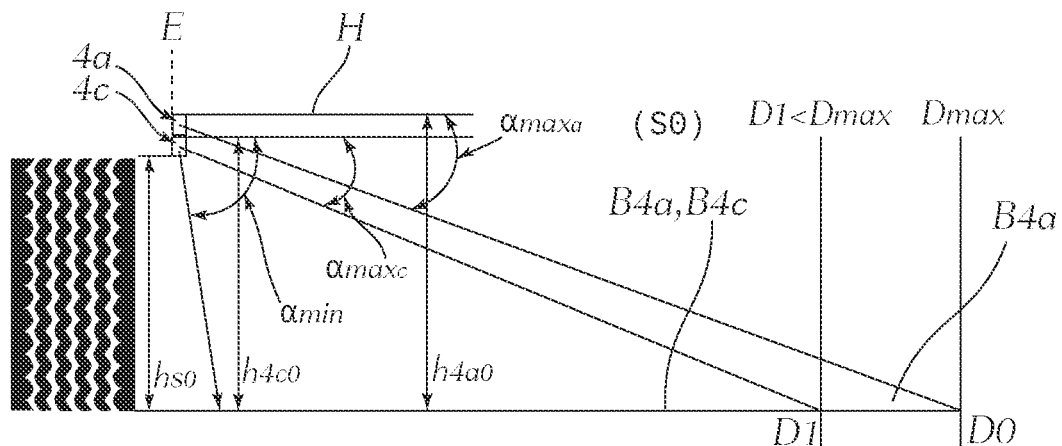
FIG. 6a shows an illustration of the emission of ground projections in a lower chassis height level.
Figure 6B:
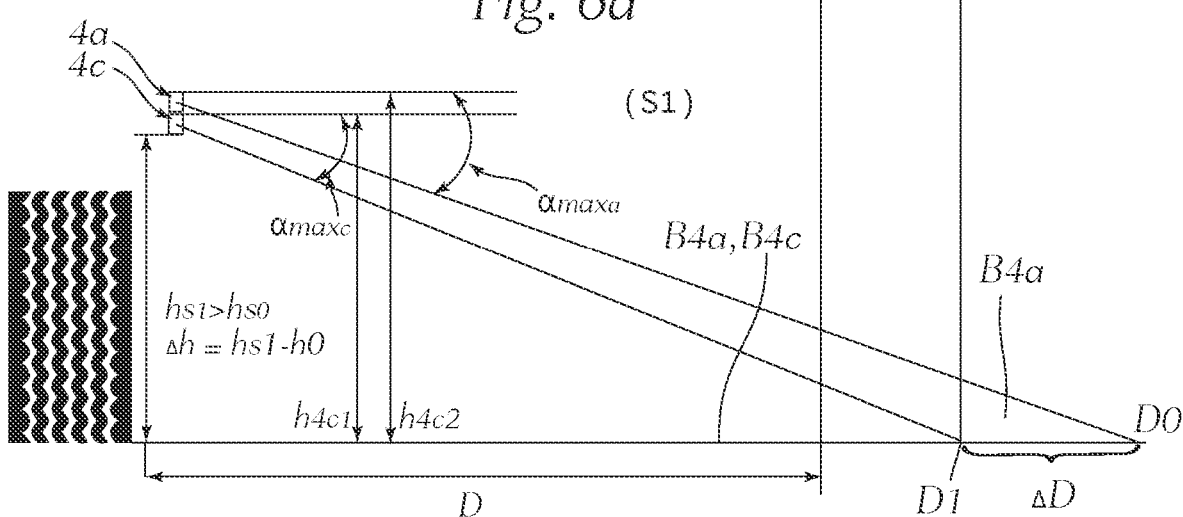
FIG. 6b shows an illustration of the emission of ground projections in an upper chassis height level.

It can be seen in FIGS. 6a and 6b that the motor vehicle lighting system 2 is designed to emit position-limited ground projections B4a, B4c. The motor vehicle 1 has a stepped height-adjustable chassis 3 (see FIG. 1), wherein at least two pre-defined chassis height levels S0, S1 (see FIGS. 6a and 6b) are provided, namely a zero level S0 and at least one higher operating level S1. The motor vehicle lighting system 2 comprises the following: at least two projection devices 4a, 4b, 4c, 4d (see FIG. 2), a control unit 5 connected to each projection device 4a, 4b, 4c, 4d for individually controlling each projection device 4a, 4b, 4c, 4d, wherein each projection device 4a, 4b, 4c, 4d is designed for assembly in or on a motor vehicle 1, in particular in or on a door sill 6 of the motor vehicle 1, wherein each projection device 4a, 4b, 4c, 4d is further designed to emit exactly one ground projection B4a, B4c in an activated state assembled on the motor vehicle 1 starting from an immediate vicinity $\alpha_{min}$ of the motor vehicle 1 onto a laterally surrounding ground B up to a maximum flat limit angle $\alpha_{maxa}$, $\alpha_{maxc}$, wherein all projection devices 4a, 4b, 4c, 4d are attached to a common support 4' and are arranged within a common plane E (see FIG. 6a) and respectively have an optical axis A4a, A4c (see FIG. 2), wherein the optical axes A4a, A4c of the projection devices are oriented parallel to one another. Each projection device 4a, 4b, 4c, 4d is designed as a microlens projection module 4 (see FIG. 3), wherein each microlens projection module 4 has a light source 41, an entrance optic 42, which has a total number of micro entrance optics 421, which are arranged in an array, wherein the entrance optic 42 is designed to receive light emitted by the light source 41, and an exit optic 43, which has a total number of micro exit optics 431, which are arranged in an array, wherein each micro entrance optic 421 is associated with exactly one micro exit optic 431, wherein the micro entrance optics 421 are designed in such a way and/or the micro entrance optics 421 and the micro exit optics 431 are arranged relative to each other in such a way that substantially all the light emanating from a micro entrance optic 421 only enters the associated micro exit optic 431, and wherein the light preformed by the micro entrance optics 421 can be projected by the micro exit optics 431 in the assembled state of the motor vehicle lighting system 2 into an area next to the motor vehicle 1 as said ground projection B4a, B4c, wherein at least one screen device 44 is arranged between the micro entrance optic 421 and the micro exit optic 431, wherein the beam angle of each projection device 4a, 4b, 4c, 4d is limited towards a horizontal plane H in the assembled state (see FIG. 6a) such that the beam is inclined downwards in relation to the horizontal plane H.

The control unit 5 has a communication interface 5a for receiving and evaluating a chassis signal S, wherein the chassis signal S contains information on the actual state of the chassis height level S0, S1. For each chassis height level S0, S1, the operation of at least one projection device 4a, 4b, 4c, 4d optimized for this purpose is provided, wherein a range limit $D_{max}$ (see FIG. 6a, 6b) of the ground projection B4a, B4c results for each projection device 4a, 4b, 4c, 4d optimized for a chassis height level S0, S1 on the basis of the height h4c0, h4a0, h4c1, h4a1 present in the respective chassis height level S0, S1 as well as the flat limit angle $\alpha_{max\_a}$, at $\alpha_{maxc}$ associated with the respective projection device 4a, 4b, 4c, 4d.

The optimization of the projection devices 4a, 4b, 4c, 4d is implemented in such a way that the projection devices 4a, 4b, 4c, 4d optimized for the respective chassis height levels S0, S1 have different flat limit angles $\alpha_{maxa}$, $\alpha_{maxc}$ such that the flat limit angles $\alpha_{maxa}$, $\alpha_{maxc}$ of the projection devices 4a, 4b, 4c, 4d, starting from that projection device 4a that is optimized for the zero level S0, increase with increasing height of the chassis height levels S0, S1 associated with the projection devices 4a, 4b, 4c, 4d according to the height difference Δh (see FIG. 6b) from the zero level S0 such that at least one projection device 4a, 4b, 4c, 4d is provided for each chassis height level S0, S1, the range limit D0, D1 of which projection device during operation of the chassis height level S0, S1 for which the respective projection device 4a, 4b, 4c, 4d is optimized matches the range limit $D_{max}$ of the projection device 4a, 4b, 4c, 4d for the zero level S0. In the exemplary embodiment shown here, only two height levels S0 and S1 and only two beam angles of the projection devices are shown. Of course, more height levels and beam angles or projection devices can also be provided, wherein each projection device is optimized for a height level and each height level is associated with at least one projection device optimized for this purpose.

It can be provided that the control of the projection devices 4a, 4b, 4c, 4d by the control unit 5 is designed in such a way that the operation of those projection devices 4a, 4b, 4c, 4d that are optimized for a lower chassis height level S0, S1 than the present chassis height level S0, S1 determined on the basis of the chassis signal S is deactivated. The control of the projection devices 4a, 4b, 4c, 4d by the control unit 5 is designed in such a way that those projection devices 4a, 4b, 4c, 4d that are optimized for operation with a higher chassis height level S1 than the determined present chassis height level S0 can still be activated.

In particular, it can be provided that the control of the projection devices 4a, 4b, 4c, 4d by the control unit 5 is designed in such a way that an animation can be projected as a result of a temporal sequence of activation of projection devices 4a, 4b, 4c, 4d, wherein the temporal sequence of activation also includes those projection devices 4a, 4b, 4c, 4d that are optimized for operation with a higher chassis height level S1 than the determined present chassis height level S0.

Alternatively, it can be provided that the control of the projection devices 4a, 4b, 4c, 4d by the control unit 5 is designed in such a way that the operation of all projection devices 4a, 4b, 4c, 4d that are not optimized for the determined present chassis height level S0, S1 is deactivated.

It can further be provided that the projection devices 4a, 4b, 4c, 4d optimized for different chassis height levels S0, S1 differ by the intended spatial positioning on the motor vehicle 1 such that with optimization for decreasing height of the chassis height levels S0, S1, the height of the assembly position of the respective projection device 4a, 4b, 4c, 4d increases.

Figure 4:
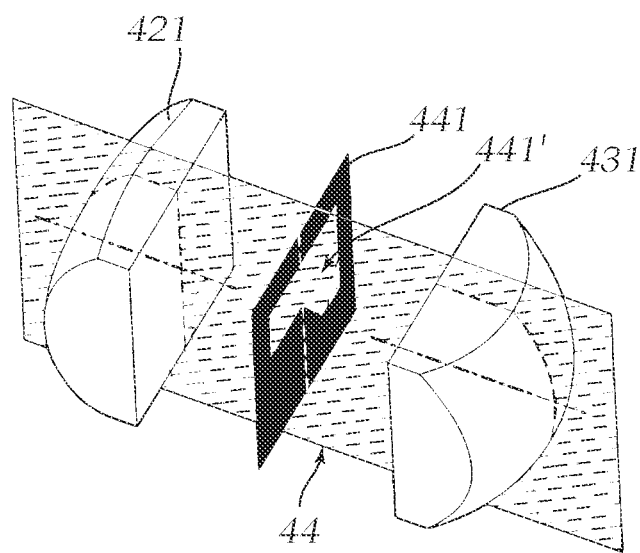
FIG. 4 shows an exemplary arrangement of a micro entry optic, a micro screen and a micro exit optic.
Figure 5:
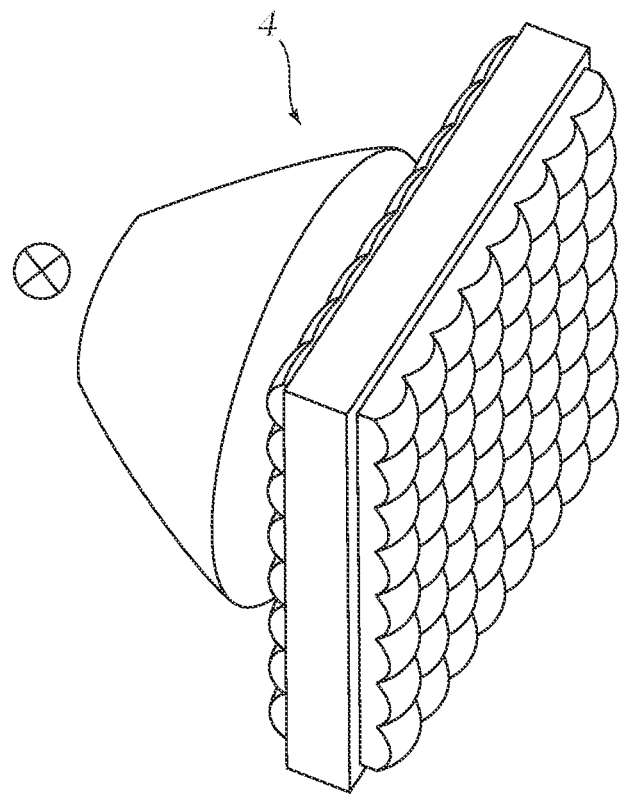
FIG. 5 shows a schematic illustration of a micro lens projection module in the assembled state.

FIG. 4 schematically shows that the entrance optics 42 and the exit optics 43 of all projection devices 4a, 4b, 4c, 4d can be identical in design, wherein the projection devices 4a, 4b, 4c, 4d optimized for the respective chassis height levels S0, S1 can differ from one another in the design of the screen devices 44 in order to achieve the different limit angles. In particular, it can be provided that the projection devices 4a, 4b, 4c, 4d optimized for different chassis height levels S0, S1 differ from one another by the design of apertures 441' (see FIG. 4) of the micro screens 441 such that with optimization for increasing height of the chassis height levels S0, S1, the size of the respective aperture 441' decreases.

It can be provided that the control unit 5 is designed to regulate the intensity of the emission of at least those light sources 41 that are associated with the projection devices 4c, 4d except for the projection device 4a, 4b of the zero level S0. It can advantageously be provided that as the size of the aperture 441' decreases, the nominal power of the light sources 41 of the corresponding projection devices 4a, 4b, 4c, 4d is increased such that the light intensity of the light distributions emitted by different projection devices 4a, 4b, 4c, 4d is the same. This means that the lower light transmission caused by the smaller aperture is compensated for such that a uniformly bright lighting effect is achieved on the projection surface with different optimized projection devices at the respective chassis height level.

It can further be provided that the difference between the height of the zero level S0 and the height of the highest chassis height level S1 is between 1 cm and 20 cm and the chassis height levels S0, S1 are preferably evenly spaced apart.

In particular it can be provided that the range limit $D_{max}$ of the ground projection in the assembled state of the motor vehicle lighting system 2 is between 0.5 m and 3 m, in particular between 1 m and 2 m, wherein the range limit $D_{max}$ is measured along a flat ground B at a normal distance from the longitudinal axis x of the vehicle 1 starting from a normal projection of the sill 6 of the motor vehicle to the end of the ground projection B4a, B4c.

In addition, it can be provided that the projection devices 4a, 4b, 4c, 4d are arranged like a matrix on the common support 4' (see FIG. 2) and an opaque insulating layer 4" is arranged between adjacent projection devices 4a, 4b, 4c, 4d.

With regard to FIG. 6a and FIG. 6b, it should be mentioned that therein the ranges of the devices 4a and 4c are shown by way of example, which is determined depending on the chassis height level. FIG. 6a shows the ranges at height level S0, FIG. 6b shows those at height level S1, which is increased compared to level S0. The range D0 and D1 are lower at the zero level S0 than at the height level S1 by the difference ΔD. In order to not exceed a maximum range limit $D_{max}$, the upper projection device 4a can therefore be switched off at height S1. The range D1 or the corresponding beam angle $\alpha_{maxc}$ of the projection device 4c below is selected such that the range D1 at height S1 exactly matches the range $D_{max}$. Selectively switching individual projection devices on and off depending on the chassis height level can therefore keep the ground projection largely constant and ensure that the limits, in particular the maximum range of the ground projection $D_{max}$, are not exceeded.

The invention is not limited to the embodiments shown, but is defined by the entire scope of protection of the claims. Individual aspects of the invention or embodiments may also be adopted and combined with each other. Any reference numbers in the claims are exemplary and merely serve to make the claims easier to read, without limiting them.

The invention claimed is:

1. A motor vehicle lighting system (2) for emitting position-limited ground projections (B4a, B4c) for a motor vehicle (1) with a stepped height-adjustable chassis (3), wherein at least two pre-defined chassis height levels (S0, S1) are provided, namely a zero level (S0) and at least one higher operating level (S1), the motor vehicle lighting system (2) comprising:
at least two projection devices (4a, 4b, 4c, 4d); and
a control unit (5) connected to each of the at least two projection devices (4a, 4b, 4c, 4d) for individually controlling each projection device (4a, 4b, 4c, 4d),
wherein each projection device (4a, 4b, 4c, 4d) is configured for assembly in or on a door sill (6) of a motor vehicle (1), wherein each projection device (4a, 4b, 4c, 4d) is further configured to emit exactly one ground projection (B4a, B4c) in an activated state assembled on the motor vehicle (1) starting from an immediate vicinity ($\alpha_{min}$) of the motor vehicle (1) onto a laterally surrounding ground (B) up to a maximum flat limit angle ($\alpha_{max\_a}$, $\alpha_{maxc}$), wherein all projection devices (4a, 4b, 4c, 4d) are attached to a common support (4') and are arranged within a common plane (E) and respectively have an optical axis, wherein the optical axes of the projection devices are oriented parallel to one another, wherein each projection device (4a, 4b, 4c, 4d) is a microlens projection module (4), wherein each microlens projection module (4) has
a light source (41),
an entrance optic (42), which has a total number of micro entrance optics (421), which are arranged in an array, wherein the entrance optic (42) is designed to receive light emitted by the light source (41), and
an exit optic (43), which has a total number of micro exit optics (431), which are arranged in an array,
wherein each micro entrance optic (421) is associated with exactly one micro exit optic (431), wherein the micro entrance optics (421) are designed in such a way and/or the micro entrance optics (421) and the micro exit optics (431) are arranged relative to each other in such a way that substantially all the light emanating from a micro entrance optic (421) only enters the associated micro exit optic (431), and wherein the light preformed by the micro entrance optics (421) can be projected by the micro exit optics (431) in the assembled state of the motor vehicle lighting system (2) into an area next to the motor vehicle (1) as said ground projection (B4a, B4c), wherein at least one screen device (44) is arranged between the micro entrance optic (421) and the micro exit optic (431), wherein the beam angle of each projection device (4a, 4b, 4c, 4d) is limited towards a horizontal plane (H) in the assembled state such that the beam is inclined downwards in relation to the horizontal plane (H),
wherein the control unit (5) has a communication interface (5a) for receiving and evaluating a chassis signal (S), wherein the chassis signal (S) contains information on the actual state of the chassis height level (S0, S1),
wherein for each chassis height level (S0, S1), the operation of at least one projection device (4a, 4b, 4c, 4d) optimized for this purpose is provided, wherein a range limit (D_max) of the ground projection (B4a, B4c) results for each projection device (4a, 4b, 4c, 4d) optimized for a chassis height level (S0, S1) on the basis of the height (h4c0, h4a0, h4c1, h4a1) present in the respective chassis height level (S0, S1) as well as the flat limit angle ($\alpha_{max\_a}$, $\alpha_{maxc}$) associated with the respective projection device (4a, 4b, 4c, 4d), and
wherein the optimization of the projection devices (4a, 4b, 4c, 4d) is implemented in such a way that the projection devices (4a, 4b, 4c, 4d) optimized for the respective chassis height levels (S0, S1) have different flat limit angles ($\alpha_{max\_a}$, $\alpha_{maxc}$) such that the flat limit angles ($\alpha_{max\_a}$, $\alpha_{maxc}$) of the projection devices (4a, 4b, 4c, 4d), starting from that projection device (4a) that is optimized for the zero level (S0), increase with increasing height of the chassis height levels (S0, S1) associated with the projection devices (4a, 4b, 4c, 4d) according to the height difference (Δh) from the zero level (S0) such that at least one projection device (4a, 4b, 4c, 4d) is provided for each chassis height level (S0, S1), the range limit (D0, D1) of which projection device during operation of the chassis height level (S0, S1) for which the respective projection device (4a, 4b, 4c, 4d) is optimized matches the range limit (D_max) of the projection device (4a, 4b, 4c, 4d) for the zero level (S0).

2. The motor vehicle lighting system (2) according to claim 1, wherein the control of the projection devices (4a, 4b, 4c, 4d) by the control unit (5) is configured such that the operation of those projection devices (4a, 4b, 4c, 4d) that are optimized for a lower chassis height level (S0, S1) than the present chassis height level (S0, S1) determined on the basis of the chassis signal (S) is deactivated.

3. The motor vehicle lighting system (2) according to claim 2, wherein the control of the projection devices (4a, 4b, 4c, 4d) by the control unit (5) is configured such that those projection devices (4a, 4b, 4c, 4d) that are optimized for operation with a higher chassis height level (S1) than the determined present chassis height level (S0) can still be activated.

4. The motor vehicle lighting system (2) according to claim 3, wherein the control of the projection devices (4a, 4b, 4c, 4d) by the control unit (5) is configured such that an animation can be projected as a result of a temporal sequence of activation of projection devices (4a, 4b, 4c, 4d), wherein the temporal sequence of activation also includes those projection devices (4a, 4b, 4c, 4d) that are optimized for operation with a higher chassis height level (S1) than the determined present chassis height level (S0).

5. The motor vehicle lighting system (2) according to claim 2, wherein the control of the projection devices (4a, 4b, 4c, 4d) by the control unit (5) is configured such that the operation of all projection devices (4a, 4b, 4c, 4d) that are not optimized for the determined present chassis height level (S0, S1) is deactivated.

6. The motor vehicle lighting system (2) according to claim 1, wherein the projection devices (4a, 4b, 4c, 4d) optimized for different chassis height levels (S0, S1) differ by the intended spatial positioning on the motor vehicle (1) such that with optimization for decreasing height of the chassis height levels (S0, S1), the height of the assembly position of the respective projection device (4a, 4b, 4c, 4d) increases.

7. The motor vehicle lighting system (2) according to claim 1, wherein the entrance optics (42) and the exit optics (43) of all projection devices (4a, 4b, 4c, 4d) are identical in design, wherein the projection devices (4a, 4b, 4c, 4d) optimized for the respective chassis height levels (S0, S1) differ from one another in the design of the screen devices (44).

8. The motor vehicle lighting system (2) according to claim 7, wherein the projection devices (4a, 4b, 4c, 4d) optimized for different chassis height levels (S0, S1) differ from one another by the design of apertures (441') such that with optimization for increasing height of the chassis height levels (S0, S1), the size of the respective aperture (441') decreases.

9. The motor vehicle lighting system (2) according to claim 1, wherein the control unit (5) is configured to regulate the intensity of the emission of at least those light sources (41) that are associated with the projection devices (4c, 4d) except for the projection device (4a, 4b) of the zero level (S0).

10. The motor vehicle lighting system (2) according to claim 8, which is configured such that as the size of the aperture (441') decreases, the nominal power of the light sources (41) of the corresponding projection devices (4a, 4b, 4c, 4d) is increased such that the light intensity of the light distributions emitted by different projection devices (4a, 4b, 4c, 4d) is the same.

11. The motor vehicle lighting system (2) according to claim 1, wherein three or more chassis height levels (S0, S1) are provided.

12. The motor vehicle lighting system (2) according to claim 1, wherein the difference between the height of the zero level (S0) and the height of the highest chassis height level (S1) is between 1 cm and 20 cm.

13. The motor vehicle lighting system (2) according to claim 12, wherein the chassis height levels (S0, S1) are evenly spaced apart.

14. The motor vehicle lighting system (2) according to claim 1, wherein the range limit (D_max) of the ground projection in the assembled state of the motor vehicle lighting system (2) is between 0.5 m and 3 m, wherein the range limit (D_max) is measured along a flat ground (B) at a normal distance from the longitudinal axis (x) of the vehicle (1) starting from a normal projection of the sill (6) of the motor vehicle to the end of the ground projection (B4a, B4c).

15. The motor vehicle lighting system (2) according to claim 14, wherein the range limit (D_max) of the ground projection in the assembled state of the motor vehicle lighting system (2) is between 1 m and 2 m.

16. The motor vehicle lighting system (2) according to claim 1, wherein the projection devices (4a, 4b, 4c, 4d) are arranged like a matrix on the common support (4') and an opaque insulating layer (4") is arranged between adjacent projection devices (4a, 4b, 4c, 4d).

17. A motor vehicle (1), comprising at least two motor vehicle lighting systems (2) according to claim 1, wherein the motor vehicle (1) has a left and a right vehicle side, and each vehicle side has at least one door (7) with a sill (6) associated with the door (7), wherein the projection devices (4a, 4b, 4c, 4d) are respectively arranged in the sills.

* * * * *